April 18, 1967 M. D. MARTIN Re. 26,192

DIE RULE AND METHOD OF FORMING AND MOUNTING THE SAME

Original Filed March 27, 1962 2 Sheets-Sheet 1

INVENTOR.
MERRILL D. MARTIN
BY George B. White
ATTORNEY

DIE RULE AND METHOD OF FORMING AND MOUNTING THE SAME

Original Filed March 27, 1962 2 Sheets-Sheet 2

INVENTOR.
MERRILL D. MARTIN
BY George B. White
ATTORNEY

United States Patent Office

Re. 26,192
Reissued Apr. 18, 1967

26,192

DIE RULE AND METHOD OF FORMING AND MOUNTING THE SAME

Merrill D. Martin, 2 Mall Court,
Oakland, Calif. 94611

Original No. 3,170,358, dated Feb. 23, 1965, Ser. No. 182,732, Mar. 27, 1962. Application for reissue Jan. 26, 1966, Ser. No. 526,954
18 Claims. (Cl. 83—665)

Matter enclosed in heavy brackets [ ] appears in the original patent but forms no part of this reissue specification; matter printed in italics indicates the additions made by reissue.

Die rules are male dies formed in a contour corresponding to the shape of the desired cut, and are used mostly for the purpose of cutting, punching or scoring corrugated boxboard or other fibre material for packaging, the cutting edge of the die rule working through the boxboard to a suitable platen.

An object of this invention is to provide a die rule and mounting for the same for use on a rotating member of a rotary shear cutter the features of which die rule and mounting greatly simplify and facilitate repairs and replacements and render the cutting more accurate.

Particularly it is an object of the invention to provide a die rule made of a flat strip of metal formed into appropriate contour and then mounted on a primary base which in turn is mounted on a second base which latter is adapted to be mounted on the rotary element of a rotary shear cutter, the said bases conforming in curvature to the surface of a cylinder about the axis of rotation of said rotating element, so that the first or primary base is quickly and easily demountable.

A further object of this invention is to provide a die rule formed out of a metal strip into suitable contour for the desired cut, an edge of which die rule is formed into a cutting edge, which may be straight or serrated, and the base edge of which is transversely notched so that by applying heat to the crotches of the notches and forcing the legs between the notches together so as to narrow the mouths of the respective notches sequentially, the die rule can be curved longitudinally of the strip to conform to the arc of a cylinder about the axis of rotation of a rotary element of a rotary shear cutter; suitable demountable means being provided for mounting the die rule on said rotary element.

A further object of the invention is to provide easily demountable mounting means for a die rule which can be quickly mounted on the rotary element of a rotary shear cutter yet accurately position and positively hold the die rule without creeping or rocking or any relative displacement or play.

A further object of the invention is to provide a die rule which conforms to the shape of the cut and to the curvature of the rotary element on which its is mounted and a method and means for forming and mounting the die rule; which are highly advantageous in operation, reduce the expense of replacement and repair, and render the cutting operation more accurate.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
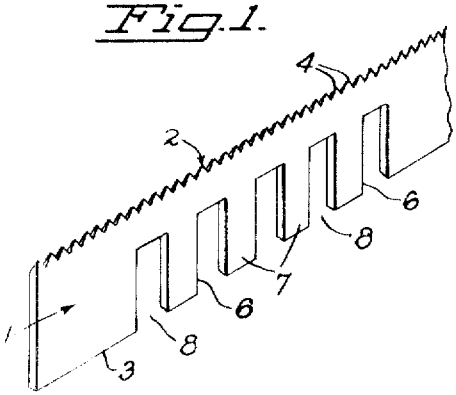
FIG. 1 is a fragmentary perspective view of the strip for the die rule.
Figure 5:
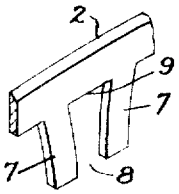
FIG. 5 is a fragmental view showing the opposite bending of adjacent legs of die rule with straight cutting edge.
Figure 7:
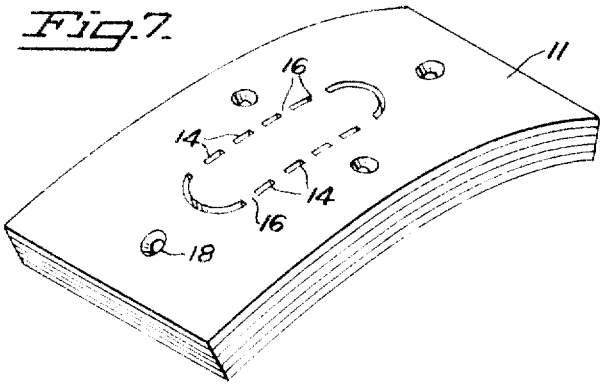
FIG. 7 is a perspective view of the laminated wood base.
Figure 6:
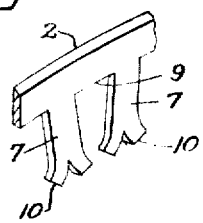
FIG. 6 is a fragmental perspective view of the die rule with straight cutting edge and legs with split ends.

The die rule of my invention is made out of a flat metal strip 1, which has a longitudinal cutting edge 2 and a longitudinal base edge 3. The cutting edge 2 may be provided with cutting serrations 4 as shown in FIG. 1, or may be straight, as shown in FIG. 5.

Figure 2:
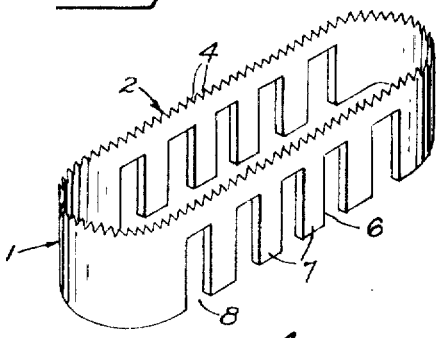
FIG. 2 is a perspective view of the straight die rule.
Figure 4:
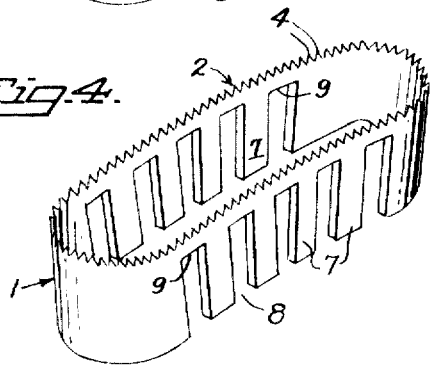
FIG. 4 is a perspective view of the radially curved die rule.
Figure 3:
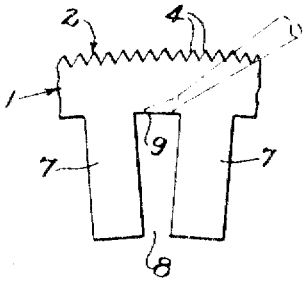
FIG. 3 is an enlarged fragmental view showing the pulling together of the edges of the notch for curving the die rule.

The base edge 3 of the strip 1 is notched transversely as shown in FIG. 2 and then the strip 1 is bent into the shape or contour of the desired cut, for instance into an elongated hole shaped as shown in FIG. 2.

When this die rule is used so that it is longitudinally parallel with the axis of rotation of the rotating element of the shear cutter, then it may be used in the aforesaid shape.

When, however, the die rule is to be used so that it extends longitudinally around an arc of the cylinder about said axis of rotation then the die rule is further formed into an arcuate shape to conform to the curvature of such cylinder.

In order to bend the die rule into longitudinally arcuate shape, each notch 6 is formed of a suitable size and spacing to permit the bending or forcing of adjacent legs 7 together for narrowing the mouth 8 of each notch 6 thereby to curve the cutting edge 2 of the strip 1 into the desired arc. The step is performed by grasping the projecting leg 7 between the notches 6 so as to put tension across the respective legs 7 tending to close the gap of the notch 6 and directing the pointed flame of an oxy-acetylene torch into the crotch 9 of the respective notch 6 so as to allow the crotch 9 to yield and the leg 7 to move to reduce the mouth 8 of the notch 6, thereby to produce the desired curve on the outer cutting edge 2 of the die rule. These steps are repeated sequentially, notch by notch along the base edge 3 until the final desired curve is achieved.

The legs 7 are bent out of the plane of the strip 1 alternately in opposite directions and, for further firming the securing grip, the base end of each leg 7 is split or bifurcated so as to form a pair of prongs 10 bent oppositely out of the plane of the leg 7.

The mounting means for the die rule includes a die rule holder base 11 detachably secured to a second base 12 which latter adapted to be secured to the usual rotating element 13 of a rotary shear cutter.

The die rule holder base 11 in the herein illustrative embodiment is a curved or tubular piece of laminated wood or plywood. The curvature of the holder base 11 is concentric with the cylinder around the axis of rotation of the rotating element.

A series of slits 14 are cut through the holder base 11 so arranged that the pattern of the slits 14 defines substantially the contour of the die rule. The interrupting ribs 16 between the slits 14 are so located as to correspond to the adjacent notches 6 and thus permit the pressing of the legs 7 into the slits 14.

Figure 8:
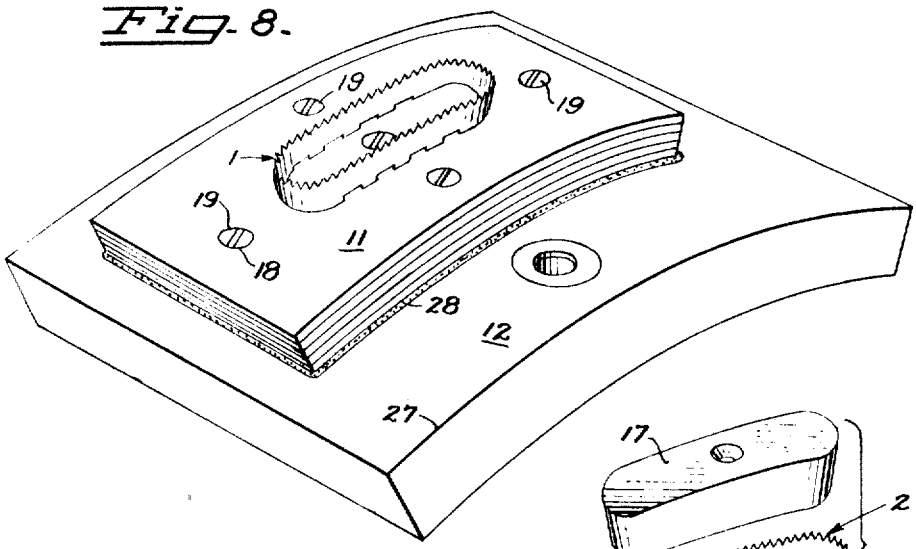
FIG. 8 is a perspective view of the assembled die rule and mounting.
Figure 10:
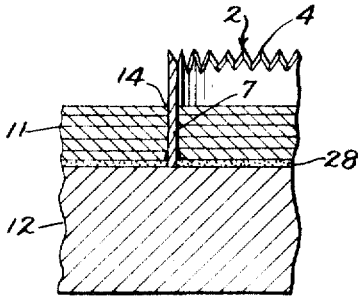
FIG. 10 is a fragmental sectional view of the die rule and the mounting.

The slits 14 are cut perpendicular or at right angles to the axis of rotation of the rotating element 13. The die rule pressed into the slits 14, therefore, is also perpendicular or at right angles to said axis of rotation. The notches 6 and legs 7 are about the same height as the thickness of the holder base 11 and the ruler strip 1 is wider than the thickness of the base 11, hence the cutting edge 2 of the die rule protrudes from the convex face of the curved holder base 11. In the herein illustration the slits are cut with a saw of about the same thickness as that of the metal strip 1 so as to assure tight fit and the die rule legs 7 are forced into the respective slits as shown in FIG. 8.

Figure 9:
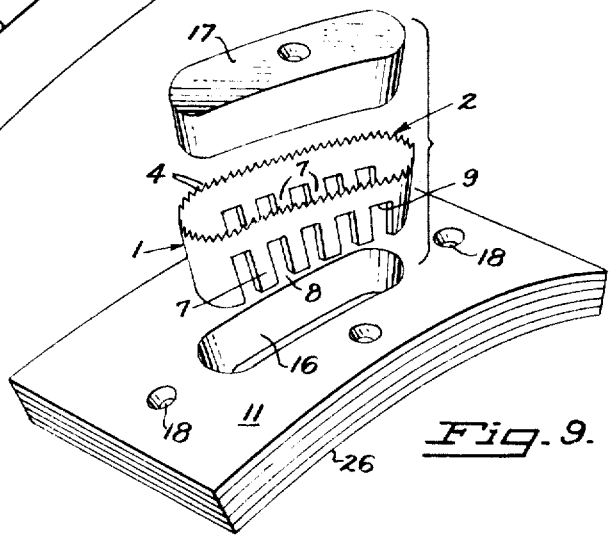
FIG. 9 is a modified view of the assembly of the die rule in a wood base with a plug.
Figure 11:
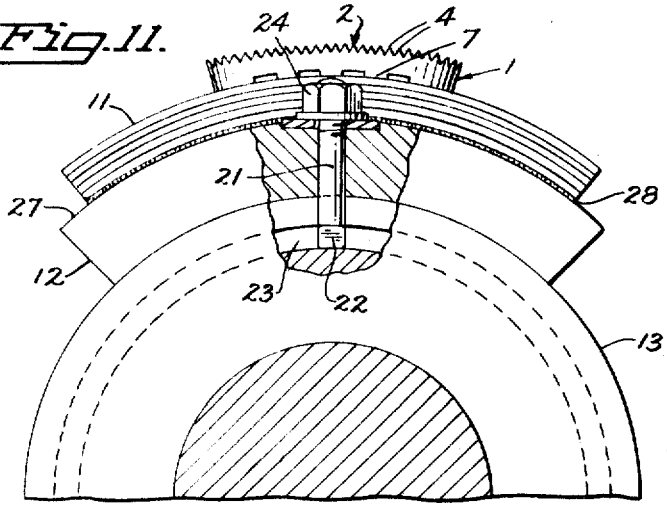
FIG. 11 is a partly sectional fragmental view of the die rule and mounting assembled on a rotating element.

In the modified form shown in FIG. 9 a continuous slit, about the thickness of the metal strip 1, is cut through the holder base 11 so as to cut out a complete hole 16 conforming to the outline of the die rule. The above described die rule is then inserted into the hole and the cut-out plug 17 is driven into the inside of the die rule as the latter is positioned in the hole 16 so as to tightly wedge the die rule in place.

The curved laminated wood base 11 has a plurality of holes 18 therethrough to accommodate fastening screws 19 for fastening the holder base 11 to the second base 12. This second base 12 is a metal platen also curved concentrically about said axis of rotation and is secured to the rotating element 13 by means of T bolts 21 and heads 22 of which are retained in the usual inverted T grooves 23 in the periphery of the cylindrical part of the rotating element 13. A usual nut 24 on the bolt 21 mounts the metal second base 12 in place and provides firm support.

In order further to assure firmness and prevent creeping or even the slightest rocking of the laminated holder base 11 relatively to the second base 12, the concave face of the holder base is covered with an initially cold flowable plastic coating containing a setting or hardening agent and capable of fitting the minute clearance between the concave face 26 of the holder base 11 and the adjacent convex face 27 of the second base 12. This is applied immediately before assembly so that as the plastic hardens it shapes itself for filling all clearances and spaces.

In the herein illustrative embodiment a coating layer 28 of so called epoxy is used. Before applying the epoxy layer 28, however, both the convex face 27 of the second base 12 and bottom portion of the slits 14 are coated with a silicon base wax or other suitable releasing agent to facilitate disassembly when required, yet assure absolutely tight forming of the epoxy coating. The epoxy applied to the concave face 26 of the holder base 11 flows into the bottom portion of the slits 14 and around the base edge 3 of the die rule so as to fill all minute space around the base of the die rule in the slit. The base portion of the die rule is also covered with said releasing agent to facilitate replacement and repair.

The die rules constructed and mounted in accordance with this invention work against the usual platens on the opposite rotating element of the rotary shear cutter not shown. For instance the serrated edged die rule works against a rubber platen and the straight cutting edge works against a metal platen.

I claim:

1. In a method of forming a die rule and die rule mounting for a rotating die cutter element the steps of providing a primary base conforming to the peripheral curvature of rotation of said element, forming slits through said primary base conforming to the contour of the die rule, pressing the die rule into the slits so that the cutting edges of the die rule protrude from the convex face of said primary base, and mounting said primary base on a curved second base adapted to be secured to said rotating element.

2. The method defined in claim 1, wherein said primary base is made of wood, and applying a flowable material containing a hardening agent on the concave face of said wood base to form a firm bedding between said bases.

3. The method defined in claim 2 wherein said material is epoxy, and coating the adjacent surfaces of said bases with an epoxy releasing agent prior to applying said epoxy so as to permit separation of the bases for replacement.

4. The method defined in claim 1, wherein said die rule is formed by the following steps, cutting a series of spaced notches transversely into the base edge of the die rule, momentarily applying heat to the crotch of a notch, and forcing the metal adjacent said notch together so as to narrow the mouth of the notch, and repeating said heating and forcing steps on the series of notches until the die rule is bent to a desired curve conforming to the curve of said primary base.

5. In the method defined in claim 1, wherein said die rule is formed of a strip of metal by the steps of, forming a series of notches transversely into the base edge of the strip, forming the strip into the shape of the cut, momentarily applying heat to the crotch of a notch, forcing the metal adjacent said notch together so as to narrow the mouth of the notch, and repeating said heating and forcing steps on the series of notches until the die rule is bent to a desired curve conforming to the curve of said primary base.

6. The method defined in claim 4, wherein said primary base is made of wood, coating the adjacent surfaces of the wood base and the second base with a flowable material and hardening agent therefor to form a firm bed and so that part of said material flows into said slits.

7. The method defined in claim 4, wherein said primary base is made of wood, coating the adjacent surfaces of the wood base and the second base with a flowable material and hardening agent therefor to form a firm bed and so that part of said material flows into said slits, and coating said adjacent surfaces with a releasing agent before applying said first coating material so as to permit separation of said bases after the hardening of said mtaerial.

8. In a method of forming a die rule for the rotating element of a rotary cutter device the steps of, providing a metal strip with a longitudinal cutting edge and a base edge, forming spaced series of notches transversely in the base edge of said strip, bending the strip into the contour of the selected cut, and narrowing the mouth of the notches, notch by notch while applying heat to the crotch of the respective notches in sequence until the die rule is bent longitudinally into a curvature conforming to the corresponding arc of a circle about the axis of rotation of said rotating element.

9. In a die rule mounting for the rotating element of a die cutting device, the combination with die rule formed of a strip of metal with a longitudinal cutting edge and an opposite base edge; of a primary mounting block of arcuate cross section conforming to part of a cylinder about the axis of rotation of said rotating element, said primary mounting block having a series of longitudinally spaced slits therethrough arranged in a pattern conforming substantially to the contour of said die rule, said die rule being notched so as to form legs therebetween fitting tightly into said slits, and a base plate capable of being mounted on said rotary element, and means to secure said block on said base plate.

10. The die rule mounting defined in claim 9, and said mounting block being made of laminated wood, and a firm bedding between said block and said base plate, said bedding being formed out of initially flowable plastic material containing a hardening agent and extending around the base edge of said die rule in said slits.

11. The die rule mounting defined in claim 9, and said mounting block being made of laminated wood, and a firm bedding between said block and said base plate, said bedding being formed out of initially flowable plastic material containing a hardening agent and extending around the base edge of said die rule in said slits, and a coating of releasing agent between said bedding and said base plate to facilitate removal of said block.

12. The invention defined in claim 9, and the base edge having a series of notches therein, legs formed between said notches being bent out of the plane of said strip alternately in opposite directions and converging toward said plane and said cutting edge for tighter fitting into said slits, and a pair of prongs formed in the base tip of each leg bent in opposite directions laterally from the plane of the leg.

13. In a method of forming a die rule mounting for a rotating die cutter element the steps of, providing a primary base curved to conform to the peripheral curvature of rotation of said element.

forming a die rule to the shape of the cut and bending the die rule to conform to the curvature of said primary base, cutting a continuous slit through the primary base conforming to the contour of said die rule and substantially of the same width as the thickness of the material of the die rule thereby cutting out a plug from said primary base, positioning the preformed and prebent die dule in said slit, forcing the plug severed by said slit into said die rule so as to hold said die rule in place, and mounting said primary base on a curved second base adapted to be secured to said rotating element.

14. In a die rule mounting for the rotating element of a die cutting device, a primary mounting block of arcuate cross section conforming to a part of a cylinder about the axis of rotation of said rotating element, a die rule formed of a strip of metal with a longitudinal cutting edge and an opposite base edge preformed into the shape to be cut and pre-bent to the curvature of said arcuate cross section of said primary mounting block and positioned in said block, said primary mounting block being made of laminated wood and having a continuous slit cut therethrough in the shape of said die rule and of about the width of the thickness of said die rule strip of metal, and a plug formed by said continuous slit being driven into its original position within said continuous slit to hold said die rule in position.

*15. In a method of forming a die rule and die rule mounting for a rotating die cutter element and steps of*

*providing a base conforming to the peripheral curvature of rotation of said element,*

*forming slits through said base conforming to the contour of the die rule,*

*pressing the die rule into the slits so that the cutting edges of the die rule protrude from the convex face of said base,*

*and mouting said base on said rotating element.*

*16. The method defined in claim 15 wherein said base is made of wood.*

*17. In a die rule mounting for the rotating element of a die cutting device,*

*the combination with a die rule formed of a strip of metal with a longitudinal cutting edge and an opposite base edge;*

*a mounting block of arcuate cross section conforming to part of a cylinder about the axis of rotation of said rotating element,*

*said mounting block having slits therethrough arranged in a pattern conforming substantially to the contour of said die rule,*

*said die rule being notched from its base edge inwardly so as to form legs on said base edge between the notches fitting tightly into said slits,*

*and means to secure said block to said rotating element.*

*18. In a die rule mounting for the rotating element of the die cutting device, the combination with a die rule formed of a strip of metal with a longitudinal cutting edge and an opposite base edge of*

*a mounting block of laminated wood being arcuate to conform to part of a cylinder about the axis of rotation of said rotating element,*

*said mounting block having slits therethrough arranged in a pattern conforming substantially to the contour of said die rule;*

*said die rule being notched so as to form legs between the notches fitting tightly into said slits,*

*and means to secure said block to said rotating element.*

References Cited by the Examiner

The following references, cited by the Examiner, are of record in the patented file of this patent or the original patent.

UNITED STATES PATENTS

| | | | |
|---|---|---|---|
| 1,082,986 | 12/1913 | Wilder et al. | 83—139 |
| 1,592,094 | 7/1926 | Funk | 93—58.2 |
| 1,737,553 | 12/1929 | Andrews | 93—58.2 |
| 1,861,456 | 6/1932 | Shaw et al. | 83—698 |
| 2,703,022 | 3/1955 | Sarno | 76—107 |
| 2,863,337 | 12/1958 | Ackley | 93—58.2 |
| 3,025,727 | 3/1962 | Smith | 76—107 |
| 3,062,083 | 11/1962 | Strnad | 83—698 |
| 3,190,194 | 6/1965 | Kirby et al. | 93—58.2 |

WILLIAM W. DYER, JR., *Primary Examiner.*

WILLIAM S. LAWSON, *Examiner.*

L. B. TAYLOR, *Assistant Examiner.*